United States Patent
Edmonds

(10) Patent No.: US 8,312,114 B2
(45) Date of Patent: Nov. 13, 2012

(54) METHOD AND SYSTEM FOR ACCESSING NETWORK COMPATIBLE DEVICES UTILIZING INTERNET-BASED BEACON TECHNOLOGY

(75) Inventor: Jonathan Allen Edmonds, Silverton, OR (US)

(73) Assignee: Xerox Corporation, Norwalk, CT (US)

( * ) Notice: Subject to any disclaimer, the term of this patent is extended or adjusted under 35 U.S.C. 154(b) by 287 days.

(21) Appl. No.: 12/760,719

(22) Filed: Apr. 15, 2010

(65) Prior Publication Data

US 2011/0258298 A1 Oct. 20, 2011

(51) Int. Cl.
*G06F 15/177* (2006.01)

(52) U.S. Cl. ....... 709/221; 709/229; 709/203; 358/1.13; 358/1.15

(58) Field of Classification Search .................. 709/221, 709/229, 203; 358/1.13, 1.15
See application file for complete search history.

(56) References Cited

U.S. PATENT DOCUMENTS

| 7,136,174 B2 | 11/2006 | Chapin et al. ............... 358/1.13 |
| 7,254,136 B1 * | 8/2007 | Gunter et al. ............... 370/401 |
| 2003/0227641 A1 * | 12/2003 | Edmonds et al. ........... 358/1.13 |
| 2004/0070779 A1 * | 4/2004 | Ferlitsch ..................... 358/1.13 |
| 2011/0176162 A1 * | 7/2011 | Kamath et al. .............. 358/1.15 |

* cited by examiner

*Primary Examiner* — Wing Chan
*Assistant Examiner* — Benjamin M Thieu
(74) *Attorney, Agent, or Firm* — Luis M. Ortiz; Kermit D. Lopez; Kevin Soules

(57) ABSTRACT

A system and method for accessing a network compatible device utilizing an Internet based beacon technology. A compatible host application can be installed on a client device and registered with a network by providing a user credential and a qualifying descriptor. The network compatible device can be configured to have access with the network in order to extract the information associated with the user accessing the compatible device. A list of users with the matching qualifying descriptor can then be displayed at a user interface associated with the compatible device. Upon authentication, the compatible device and the compatible host application installed on the client device can be connected and the network address associated with the compatible device and the client device can be accessed.

18 Claims, 3 Drawing Sheets

METHOD AND SYSTEM FOR ACCESSING NETWORK COMPATIBLE DEVICES UTILIZING INTERNET-BASED BEACON TECHNOLOGY

TECHNICAL FIELD

Embodiments are generally related to wireless communication systems and techniques. Embodiments also relate in general to the field of computers and similar technologies and, in particular, to software utilized in this field. Embodiments are additionally related to methods and systems for accessing network compatible devices via a network.

BACKGROUND OF THE INVENTION

Network compatible devices can interact with an assemblage of varying rendering devices (e.g., printers, multi-function devices), client devices, servers, and other components that are connected to and communicate over a network. Such network compatible devices can communicate with and link to varying client devices via a hardwired or wireless connection in order to provide operations such as, for example, printing, scanning, and other operations via the network.

A client device such as, for example, a personal computer, a desktop computer, a handheld computing device, etc., can include a host application that enables the device to operatively communicate with a network compatible device. A host application ensures that the client device and the network compatible device are connected to the same network and the network itself is aware of the resources or devices that are available for selection. Such an application associated with the client device can employ a temporary signal state and the associated network broadcasts to connect users with a network compatible device. For example, a user may run an installer at the client device and select an "install" option from a printer interface in order to install a printer.

With the advent of wireless communications, it has become very common for network compatible devices to be physically located on separate networks from the client device. The majority of prior art networking approaches, however, are not capable of connecting a client device with network compatible devices spanning multiple subnets. Prior art networking approaches typically require a physical connection to be established with the network device before the services provided by the device are discovered. Additionally, such prior art approaches cannot find a device network address and discovery protocols to detect the device and span multiple subnets.

Based on the foregoing, it is believed that a need exists for an improved system and method for accessing a network compatible device utilizing internet-based beacon technology, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for accessing a network compatible device.

It is another aspect of the disclosed embodiments to provide for an improved internet-based beacon technology.

It is a further aspect of the disclosed embodiments to provide for an improved method and system for connecting the network compatible devices utilizing internet-based beacon technology.

The aforementioned aspects and other objectives and advantages can now be achieved as described herein. A system and method for accessing a network compatible device (e.g., multifunction device) utilizing an Internet based beacon technology is disclosed herein. A compatible host application can be installed on a client device (e.g., smart phone, personal computer, laptop etc) and registered with a network (e.g., Internet) by providing a user credential and a qualifying descriptor. Such information (e.g., user ID, password, network address) can be transmitted to the network via a protocol (e.g., HTTPS) and stored within the network.

The network compatible device can be configured to access the network in order to extract the information associated with the user accessing the compatible device. A list of users with the matching qualifying descriptor can then be displayed at a user interface associated with the compatible device. Upon authentication, the compatible device and the compatible host application installed on the client device can be connected and the network address associated with the compatible device and the client device can be accessed.

The compatible host application permits a user to register with an Internet service as well as interact with the compatible device once the connectivity has been established. The compatible host application can automatically detect an end user ID and an associated network address. The compatible device requests a list of actively registered users from the service provider via the protocol and returns the list of end user IDs along with encrypted passwords and other relevant attributes. The list of users can be further filtered based on the qualifying descriptor data stored at a storage unit associated with the compatible device.

The respective user ID can be selected from the list and a valid password can be provided in order to authenticate and access the user's network address. Such information can then be employed by the compatible device to provide the network address associated with the compatible device to the end user compatible host application. The system and method can therefore provide a hands-on mechanism for the users to effectively select and access the compatible network devices associated with multiple subnet environments.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Figure 1:
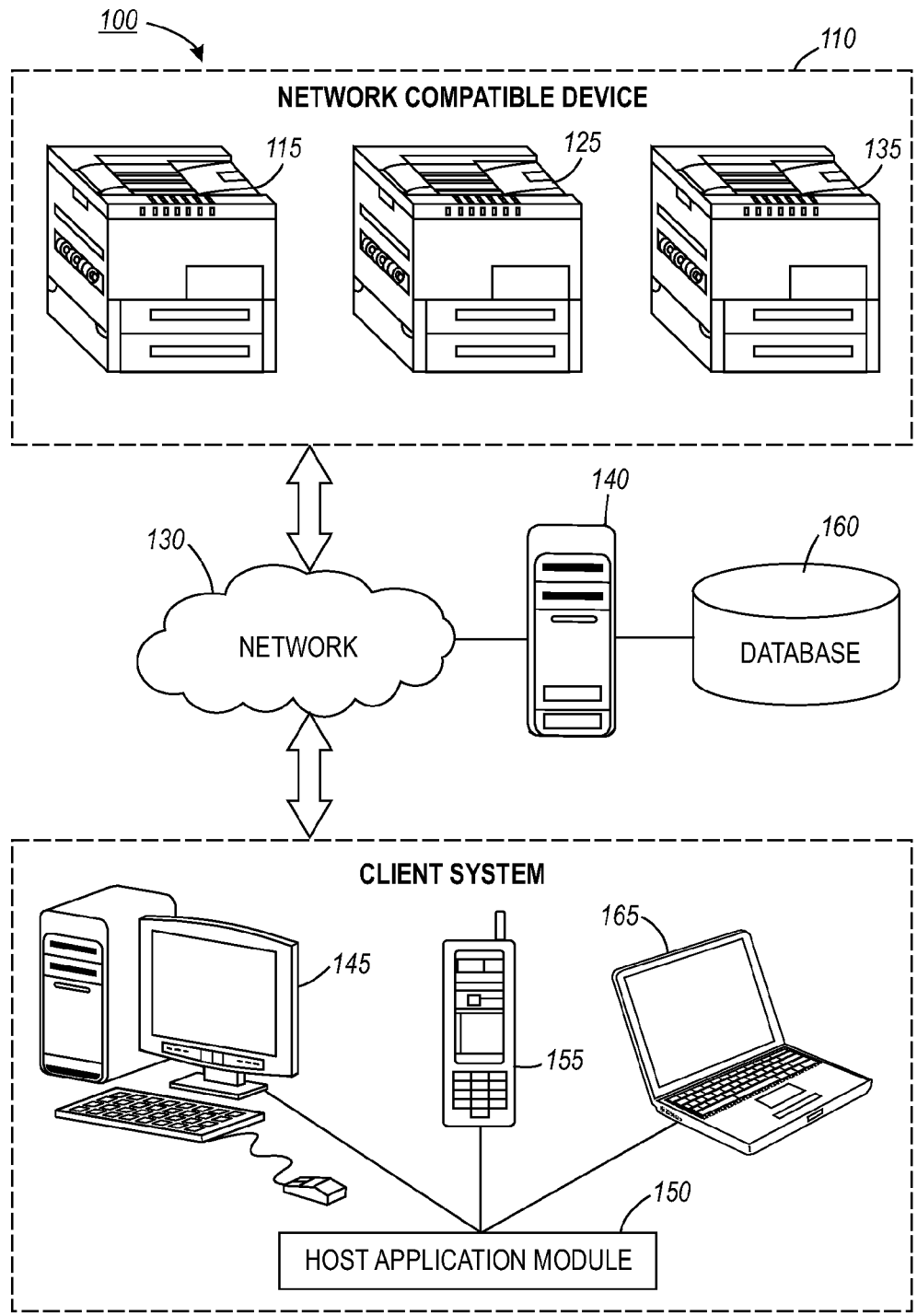
FIG. 1 illustrates a graphical representation of a network system associated with various client devices and network-accessible devices, in accordance with the disclosed embodiments.
Figure 2:
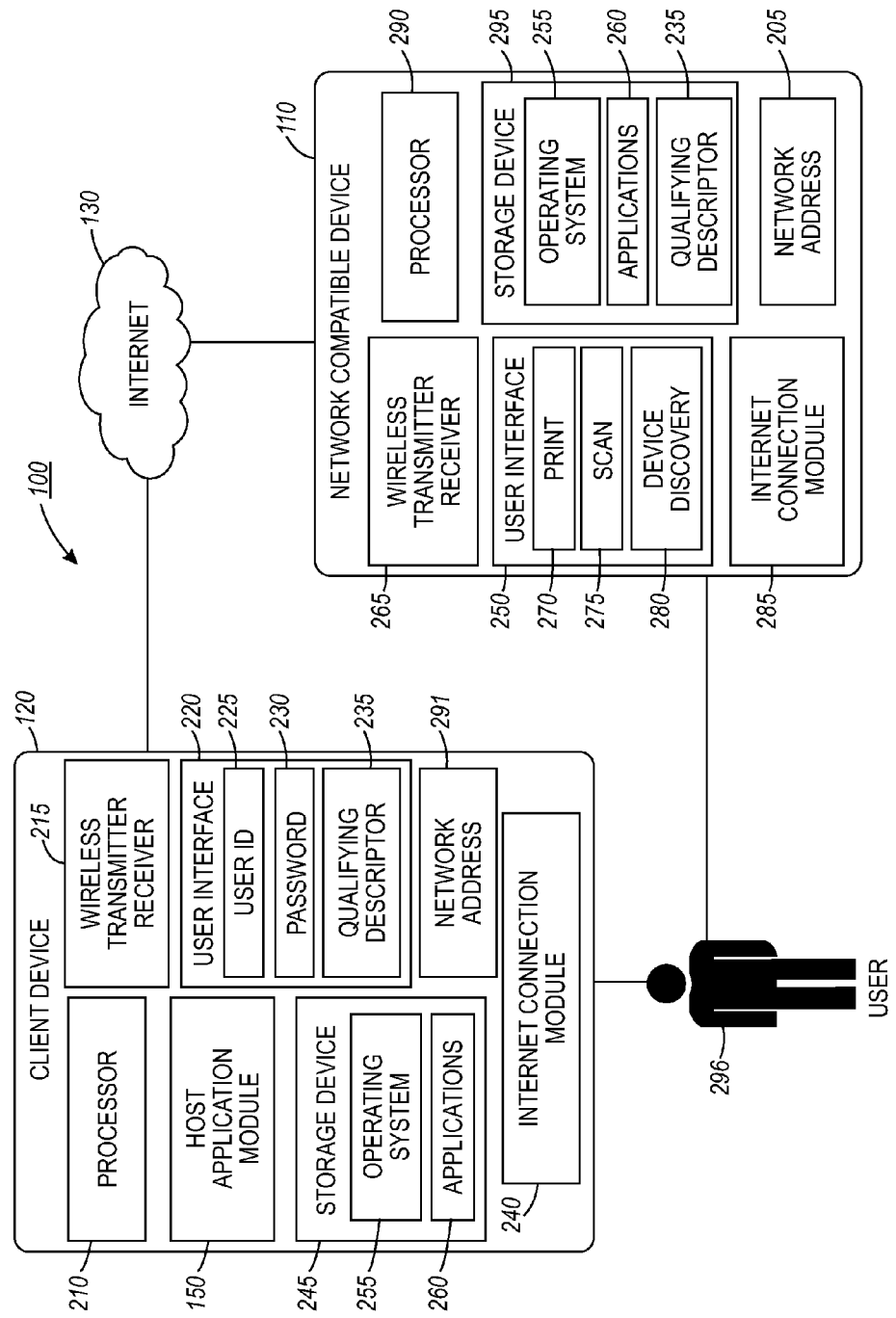
FIG. 2 illustrates a block diagram of a network system for connecting a client device with a network compatible device via Internet, in accordance with the disclosed embodiments.

FIGS. 1-2 are provided as an exemplary diagram of a network system in which embodiments of the present invention can be implemented. It should be appreciated that FIG. 1 is only exemplary and is not intended to assert or imply any limitation with regard to the environments in which aspects or embodiments of the present invention can be implemented. Many modifications to the depicted environments can be made without departing from the spirit and scope of the disclosed embodiments.

FIG. 1 illustrates a graphical representation of a network system 100 associated with various client devices and network-accessible devices, in accordance with the disclosed embodiments. The system 100 generally includes one or more network compatible device(s) 110, such as, for example, devices 115, 125 and 135. The system 100 can also include client devices such as, for example, computing devices 145, 155, 165, which are operatively configured in association with a network 130. The system 100 can be employed to operatively connect one or more of the client devices 145, 155, 165 with the network compatible device(s) 110 and to wirelessly transmit the network address and any other data that can be employed to access the compatible device(s) 110.

The client devices 145, 155, 165 can be, for example, computing device such as, for example, a personal computer, a computer workstation, a laptop computer or another computing apparatus or system (e.g., wireless cellular telephone, Smartphone, etc). In the depicted example, the client devices 145, 155 and/or 165 can be devices that are capable of wireless communication. In some embodiments, the devices 115, 125 and 135 may each be, for example, an MFD (Multifunction Device) that provides one or more designated operations such as, for example, printing, scanning and/or device discovery operations. In other embodiments, the devices 115, 125 and/or 135 may simply be printers.

Note that as utilized herein, the term multifunction device (including the acronym MFD) may refer to an apparatus or system such as a printer, scanner, fax machine, copy machine, etc., and/or a combination thereof. For the discussion herein, it can be assumed that the devices 115, 125 and/or 135 are MFD's. MFDs 115, 125 and 135 thus are capable of multiple rendering functions such as printing, copying, scanning, faxing, etc. Thus, in some embodiments, MFDs 115, 125 and 135 can be implemented with a single rendering function such as printing. In other embodiments, MFDs 115, 125 and 135 can be configured to provide multiple rendering functions such as scanning, faxing, printing, and copying.

The client devices 145, 155 and/or 165 can communicate with the network compatible device(s) 110 through, for example, the computer network 130 or other networking configuration. Network 130 may employ any network topology, transmission medium, or network protocol such as, for example, the Internet. Network 130 may include connections such as wired links, wireless communication links, fiber optic cables, USB components, and so forth. In the depicted example, server 140 connects to and communicates with the network 130 along with a storage unit 160 (e.g. a memory, database, etc). In addition, the client devices 145, 155 and/or 165 are preferably configured to connect to and communicates with the network 130.

The server 140 provides data such as boot files, operating system images, and applications to the client devices 145, 155 and/or 165. Specifically, clients may connect to any member of a network of servers, which provide equivalent content. In the depicted example, network system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network system 100 may also be implemented as a number of different types of networks such as, for example, the Internet.

The client devices 145, 155 and/or 165 can be further configured with a compatible host application module 150 that can be employed to register a user within the network 130 utilizing one or more user credentials. Note that as utilized herein, the term "module" may refer to a physical hardware component and/or to a software module. In the computer programming arts, such a software "module" can be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

FIG. 2 illustrates a block diagram of the network system 100 for connecting the client devices 145, 155 and/or 165 with the network compatible device(s) 110 via the network 130 (e.g., the Internet), in accordance with the disclosed embodiments. Note that in FIGS. 1-3, identical or similar blocks are generally indicated by identical reference numerals. The client devices 145, 155 and/or 165 can be configured to include a wireless transmitter/receiver 215, a user interface 220, an Internet connection module 240, the compatible host application module 150, a processor 210, and a storage device 245. Similarly, the network compatible device(s) 110 can include a wireless transmitter/receiver 265, a user interface 250, an Internet connection module 285, a processor 290, and a storage device 295. The interface 220 and 250, which is preferably a graphical user interface (GUI), can serve to display results, whereupon a user may supply additional inputs or terminate a particular session.

The client devices 145, 155 and/or 165 can be connected to the network compatible device(s) 110 via the Internet service 130. The compatible host application module 150 can be installed on the client devices 145, 155 and/or 165 and registered with the network 130 by providing one or more user credentials such as a user ID 225, a user password 230, a network address 205, and a qualifying descriptor 235 associated with a user 296. Such information can be transmitted to the Internet service 130 via a protocol and stored within the database 160 associated with network 130. Note that the protocol can be, for example, a Hypertext Transfer Protocol Secure (HTTPS). In general, HTTPS is a combination of the Hypertext Transfer Protocol with the SSL/TLS protocol to provide encryption and secure identification of the server.

The network compatible device(s) 110 can be configured to access the network 130 in order to extract the information associated with the user 296 accessing the compatible device(s) 110. The compatible host application module 150 requests the compatible device(s) 110 for the end user 296 with a matching qualifying descriptor 235. The device(s) 110 can request the list of actively registered end users from the network 130 via, for example, HTTPS protocol, and return a list of end user IDs along with encrypted passwords and other relevant attributes. The list with a matching qualifying descriptor 235 can then be displayed on the compatible device(s) 110 and the end user 296 can select the user ID 225 from the list and provide the password 230 for authentication. Upon authentication, the compatible device(s) 110 and the compatible host application module 150 installed on the client devices 145, 155 and/or 165 can be connected and the network address associated with the client devices 145, 155 and/or 165 can be accessed.

The wireless transmitter/receiver 215 and 265 can wirelessly transmit and receive data within the network 130. Such wireless transmitter/receiver 215 and 265 can adapt any suitable techniques, methods, protocols, and the like, to effect wireless transmission (and receipt) of data in the network 130. The Internet connection module 240 and 285 can be configured to establish an Internet connection utilizing suitable Internet connection techniques, which are well-known in the art. The storage device 245 and 295 can comprise any suitable computer-readable medium. Examples include, without limitation, read only memory (ROM), random access memory (RAM), a hard disk, flash memory, EEPROM, and the like. Storage devices 245 and 295 can further include an operating system 255 and one or more applications 260 that are executable by the processors 210 and 290.

The compatible host application module 150 further permits the user to register with the network 130 as well as interact with the compatible device(s) 110 once connectivity has been established. The compatible host application module 150 can also automatically detect the user ID 225 as well as, for example, the network address 291 within the client devices 145, 155 and/or 165. The device(s) 110 can request the list of actively registered users from the network 130 via, for example, HTTPS protocol (or another appropriate protocol), and return the list of user IDs 225 along with encrypted passwords 230 and other relevant attributes. The storage unit 295 associated with the compatible device(s) 110 can store the qualifying descriptor data 235 which can be further employed to filter valid users from the network 130.

The user 296 can select respective user ID 225 and provide the password 230 for authentication. Once the user 296 is authenticated by selecting the user ID 225 from the list and providing a valid password 230, the client devices 145, 155 and/or 165 can connect the device(s) 110 in order to access the user's network address 291 associated with the device(s) 110. Such information can then be employed by the compatible device(s) 110 to provide the network address 205 associated with the compatible device 110(s) to the user's compatible host application module 150.

Upon exchange of network addresses 291 and 205, the client devices 145, 155 and/or 165 can be connected with the compatible network device(s) 110 and the requested services can be effectively provided to the user 296. For example, consider a user is running a mobile express print driver. The compatible device(s) 110 can communicate directly with the driver, permitting the driver to initiate a print directly to the compatible device(s) 110. The end user can almost immediately check the job printing and can pick it up and return to the laptop 165. The system 100 can therefore provide a hands-on mechanism for the user 296 to effectively select and access the compatible network device(s) 110 associated with multiple subnet environments.

Figure 3:
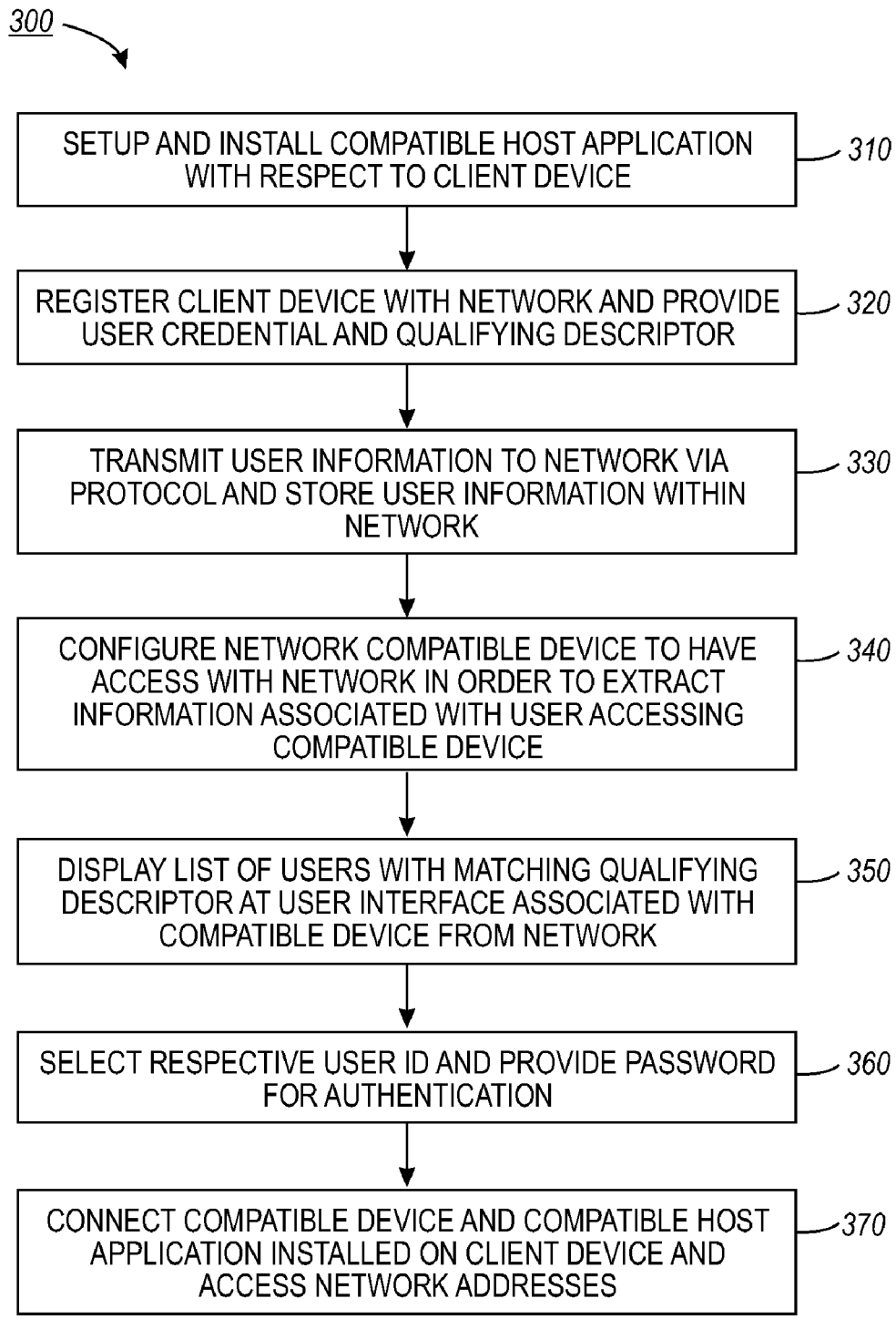
FIG. 3 illustrates a high level flow chart of operation illustrating logical operational steps of a method for accessing

FIG. 3 illustrates a high level flow chart of operation illustrating logical operational steps of a method 300 for accessing the network compatible devices 110 utilizing an internet based beacon technology, in accordance with the disclosed embodiments. The compatible host application 150 can be set up and installed with respect to the client devices 145, 155 and/or 165, as indicated at block 310. The client devices 145, 155 and/or 165 can be registered with the network 130 and the user credentials 225, 230, and/or 291 and the qualifying descriptor 235 can be provided, as depicted at block 320. The user information can be transmitted to the network 130 via a protocol and the user information can be stored within network 130, as illustrated at block 330.

The network compatible device(s) 110 can be configured to access the network 130 in order to extract information associated with user 296 accessing the compatible device(s) 110, as indicated at block 340. A list of users with a matching qualifying descriptor 235 can be displayed at the user interface 250 associated with the compatible network device(s) 110 from the network 130, as illustrated at block 350. The respective user ID can be selected and the password can be provided for authentication, as depicted at block 360. The device(s) 110 and the compatible host application 115 installed on the client devices 145, 155 and/or 165 can be connected and the network addresses 291 and 205 associated with the compatible device(s) 110 and the client devices 145, 155 and/or 165 can be accessed, as illustrated at block 370.

The method and system described herein permits the network compatible device(s) 110 to be wirelessly discovered by the client devices 145, 155 and/or 165 that can be employed for the intended purpose. The network compatible device(s) 110 can be configured to wirelessly transmit the network address and any other data that can be employed to access the device(s) 110. The client devices 145, 155 and/or 165 that are unaware of the various devices can receive the transmitted network address and can thereby become knowledgeable of such network compatible device(s) 110. The network address can then permit the client devices 145, 155 and/or 165 to access and utilize the network compatible device(s) 110 via network (e.g., the Internet).

Based on the foregoing, it can be appreciated that a method is disclosed, which includes installing a compatible host application at a client device in order to thereafter register the client device with respect to a network by providing one or more user credentials and a qualifying descriptor, configuring a network compatible device in association with the network in order to extract the user credential(s) and the qualifying descriptor associated with a user accessing the network compatible device, displaying a plurality of users with a matching qualifying descriptor at a user interface associated with the compatible device from the network, and authenticating the user in order to access a network address associated with the compatible device and the client device.

Such a method can further include transmitting the user credential(s) and the qualifying descriptor to the network via a protocol. Additional operational steps can include the user credential(s) and the qualifying descriptor in a storage unit associated with the network. Such user credential includes, for example, a user ID, a password and/or a network address, and so forth. Another operational step can include filtering the users based on the qualifying descriptor stored via the storage unit.

Additionally, such a method can include selecting a user ID from the plurality of users in order to thereafter provide a password in order to access the network address associated with the network compatible device (or devices), and providing a network address associated with the compatible device to the compatible host application associated with the client device. The network compatible device(s) can be, for example, a printer, a multi-function device, etc. The client device can be, for example, a laptop computer, a data processing system, or device such as a personal computer or computer workstation, a personnel digital assistant, a mobile communication device such as a cellular telephone, Smartphone, and so forth. The aforementioned protocol, in some embodiments, can be, for example, a secure hypertext transfer protocol or another appropriate protocol.

It can be further appreciated, based on the foregoing, that a system is disclosed, which includes, for example, a processor, a data bus coupled to the processor, and a computer-usable medium embodying computer code, the computer-usable medium being coupled to the data bus. The computer program code can be configured instructions executable by the processor and configured for installing a compatible host application at a client device in order to thereafter register the client device with respect to a network by providing one or more user credentials and a qualifying descriptor, configuring a network compatible device in association with the network in order to extract the user credential(s) and the qualifying descriptor associated with a user accessing the network compatible device, displaying a plurality of users with a matching qualifying descriptor at a user interface associated with the compatible device from the network, and authenticating the user in order to access a network address associated with the compatible device and the client device.

The aforementioned instructions can be further configured for transmitting the user credential(s) and the qualifying descriptor to the network via a protocol, and/or storing the user credential(s) and the qualifying descriptor in a storage unit associated with the network. As indicated previously, the user credential(s) can be, for example, a user ID, a password, a network address, etc. The aforementioned instructions can also be configured for filtering the users based on the qualifying descriptor stored via the storage unit. Such instructions can also be configured for selecting a user ID from the plurality of users in order to thereafter provide a password in order to access the network address associated with the network compatible device(s), and providing a network address associated with the compatible device to the compatible host application associated with the client device.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method, comprising:
installing a compatible host application module at a memory of a client device in order to thereafter register said client device with respect to a network by providing at least one user credential and a qualifying descriptor to a network compatible device;
configuring e said network compatible device in association with said network to extract said at least one user credential and said qualifying descriptor associated with a user accessing said network compatible device;
displaying a plurality of users with a matching qualifying descriptor at a user interface associated with said network compatible device from said network and authenticating said user in order to access a network address associated with said compatible device and said client device; and
selecting a user ID from said plurality of users in order to thereafter provide a password at said network compatible device in order to access said network address associated with said at least one network compatible device; and
providing a network address associated with said compatible device to said compatible host application associated with said client device.

2. The method of claim 1 further comprising transmitting said at least one user credential and said qualifying descriptor to said network via a protocol.

3. The method of claim 2 wherein said protocol comprises a secure hypertext transfer protocol.

4. The method of claim 1 further comprising storing said at least one user credential and said qualifying descriptor in a storage unit associated with said network.

5. The method of claim 4 further comprising filtering said plurality of users at said network, based on said qualifying descriptor stored via said storage unit associated with said network, and displaying a list of a plurality of said user IDs and said qualifying descriptors on said network compatible device.

6. The method of claim 1 wherein said at least one user credential comprises at least one of the following types of credentials:
a user ID;
a password; and
a network address.

7. The method of claim 1 wherein said at least one network compatible device comprises a multi-function device.

8. The method of claim 1 wherein said client device comprises at least one of the following types of devices:
a laptop;
a data processing system;
a personnel digital assistant;
a mobile communications device; and
a Smartphone.

9. A system, comprising:
a processor;
a data bus coupled to said processor; and
a computer-usable medium embodying computer code, said computer-usable medium being coupled to said data bus, said computer program code comprising instructions executable by said processor and configured for:
installing a compatible host application module at a memory of a client device in order to thereafter register said client device with respect to a network by providing at least one user credential and a qualifying descriptor to a network compatible device;

configuring e said network compatible device in association with said network to extract said at least one user credential and said qualifying descriptor associated with a user accessing said network compatible device;

displaying a plurality of users with a matching qualifying descriptor at a user interface associated with said network compatible device from said network and authenticating said user in order to access a network address associated with said compatible device and said client device;

selecting a user ID from said plurality of users in order to thereafter provide a password at said network compatible device in order to access said network address associated with said at least one network compatible device; and providing a network address associated with said compatible device to said compatible host application associated with said client device.

10. The system of claim 9 wherein said instructions are further configured for transmitting said at least one user credential and said qualifying descriptor to said network via a protocol.

11. The system of claim 10 wherein said protocol comprises a secure hypertext transfer protocol.

12. The system of claim 9 wherein said instructions are further configured for storing said at least one user credential and said qualifying descriptor in a storage unit associated with said network.

13. The system of claim 12 wherein said instructions are further configured for filtering said plurality of users at said network, based on said qualifying descriptor stored via said storage unit associated with said network, and displaying a list of a plurality of said user IDs and said qualifying descriptors on said network compatible device.

14. The system of claim 9 wherein said at least one user credential comprises at least one of the following types of credentials:
a user ID;
a password; and
a network address.

15. The system of claim 9 wherein said at least one network compatible device comprises a multi-function device.

16. The system of claim 9 wherein said client device comprises at least one of the following types of devices:
a laptop;
a data processing system;
a personnel digital assistant; and
a mobile communication device.

17. The system of claim 9 wherein said instructions are further configured for:
transmitting said at least one user credential and said qualifying descriptor to said network via a protocol; and
storing said at least one user credential and said qualifying descriptor in a storage unit associated with said network.

18. The system of claim 17 wherein said instructions are further configured for filtering said plurality of users at said network, based on said qualifying descriptor stored via said storage unit associated with said network, and displaying a list of a plurality of said user IDs and said qualifying descriptors on said network compatible device.

* * * * *